US 8,128,236 B2

(12) United States Patent
Kim et al.

(10) Patent No.: US 8,128,236 B2
(45) Date of Patent: Mar. 6, 2012

(54) IMAGE PROJECTING APPARATUS

(75) Inventors: Jin Sub Kim, Seongnam-si (KR); Sang Jun Choi, Osan-si (KR); Byung Jo Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 360 days.

(21) Appl. No.: 12/366,697

(22) Filed: Feb. 6, 2009

(65) Prior Publication Data

US 2009/0290131 A1 Nov. 26, 2009

(30) Foreign Application Priority Data

May 20, 2008 (KR) .................. 10-2008-0046779

(51) Int. Cl.
 *G03B 21/18* (2006.01)
(52) U.S. Cl. .............. 353/57; 353/52; 353/53; 353/54; 353/55; 353/56; 353/58; 353/59; 353/60; 353/61; 361/679.52; 361/688; 361/703; 361/709; 361/712
(58) Field of Classification Search ............ 353/52, 353/53, 54, 55, 56, 57, 58, 59, 60, 61; 361/679.52, 361/688, 703, 709, 712; 362/264, 294, 218, 362/267, 373, 345, 431, 545, 547, 580, 646, 362/652, 311; 165/80.2, 80.5, 104.11, 104.21, 165/104.26, 104.33, 185; 438/69, 151, 675
See application file for complete search history.

(56) References Cited

U.S. PATENT DOCUMENTS 5,572,408 A * 11/1996 Anhalt et al. ............ 361/737
(Continued)

FOREIGN PATENT DOCUMENTS

CN 1854885 11/2006
(Continued)

OTHER PUBLICATIONS

European Search Report issued Sep. 29, 2009 in EP Application No. 09155221.6.

(Continued)

*Primary Examiner* — Georgia Y Epps
*Assistant Examiner* — Sultan Chowdhury
(74) *Attorney, Agent, or Firm* — Stanzione & Kim, LLP (57) ABSTRACT

Disclosed is an image projecting apparatus having a cooling device, which cools heat generated from a plurality of light sources respectively emitting light of different colors and heat generated from a display device simultaneously, while effectively dispersing the heat. The image projecting apparatus includes a projecting system which projects light; a display device disposed in series with the projecting system; an optical system disposed in parallel with the projecting system, and including a plurality of light sources which transmit the light to the display device and generate heat when the light is transmitted to the display device; a heat dissipation device disposed at an outer edge of the optical system which dissipates the heat generated from the plurality of light sources; and a cooling fan disposed opposite to the display device, which inhales air and discharges the air to the heat dissipation device.

28 Claims, 6 Drawing Sheets

U.S. PATENT DOCUMENTS

| | | | |
|---|---|---|---|
| 6,805,448 B2 * | 10/2004 | Yokoyama et al. | 353/85 |
| 6,986,582 B2 * | 1/2006 | Kobayashi | 353/61 |
| 7,736,936 B2 * | 6/2010 | Tanaka | 438/69 |
| 7,755,901 B2 * | 7/2010 | Shen | 361/719 |
| 7,850,347 B2 * | 12/2010 | Speier et al. | 362/373 |
| 2003/0179579 A1 | 9/2003 | Hsu et al. | |
| 2006/0164600 A1 | 7/2006 | Morejon et al. | |
| 2006/0203206 A1 | 9/2006 | Kim | |
| 2006/0279706 A1 * | 12/2006 | Bash et al. | 353/54 |
| 2006/0290893 A1 | 12/2006 | Lim et al. | |
| 2007/0019419 A1 | 1/2007 | Hafuka et al. | |
| 2007/0115438 A1 * | 5/2007 | Tsubura | 353/57 |
| 2007/0177108 A1 * | 8/2007 | Arboix | 353/57 |
| 2007/0211219 A1 * | 9/2007 | Ko | 353/52 |
| 2008/0198336 A1 * | 8/2008 | Chen et al. | 353/58 |
| 2009/0153805 A1 * | 6/2009 | Li et al. | 353/57 |

FOREIGN PATENT DOCUMENTS

| | | |
|---|---|---|
| KR | 20060097937 | 9/2006 |
| KR | 20060110695 | 10/2006 |

OTHER PUBLICATIONS

Chinese Office Action issued Jan. 29, 2010 in CN Application No. 2008101740578.

* cited by examiner

IMAGE PROJECTING APPARATUS

CROSS-REFERENCE TO RELATED APPLICATIONS

This application claims priority from Korean Patent Application No. 10-2008-0046779, filed May 20, 2008, in the Korean Intellectual Property Office, the disclosure of which is incorporated herein by reference.

BACKGROUND OF THE INVENTION

1. Field of the Invention

Apparatuses and methods consistent with the present invention relate to an image projecting apparatus, and more particularly, to an image projecting apparatus, which has a cooling structure to cool a plurality of heat generating units installed therein.

2. Description of the Related Art

In general, image projecting apparatuses are image display apparatuses, which display a projected image on a screen using light emitted from light sources. As small display devices, such as a transmission-type Liquid Crystal Display (LCD) and a Digital Micro-mirror Device (DMD), are used, image projecting apparatuses have been developed toward miniaturization and light-weight trends.

Here, ultra-high pressure halogen lamps are mainly used as light sources. However, research and development of the image projecting apparatuses toward miniaturization and light-weight trends using small light sources, such as Light Emitting Diodes (LEDs), have been continuously carried out.

If LEDs are used as light sources, a plurality of white LEDs emitting white light may be used, or a plurality of red LEDs, a plurality of green LEDs, and a plurality of blue LEDs may be used to emit white light. If the red LEDs, the green LEDs, and the blue LEDs are used, LED modules, which respectively include a plurality of LEDs respectively emitting red, green, and blue lights and are respectively connected to LED substrates supporting and driving the LEDs, are provided.

When an image projecting apparatus is operated, light sources emit light and generate heat simultaneously. If LEDs are used as the light sources, LED modules are separately installed according to colors of light, and thus heat is generated from several positions concurrently. Accordingly, a suitable cooling device has been required.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

One aspect of the invention provides an image projecting apparatus having a cooling device, which cools heat generated from a plurality of light sources respectively emitting light of different colors at different positions of an optical system and heat generated from a display device simultaneously, while effectively dispersing the heat.

Additional aspects and utilities of the present general inventive concept will be set forth in part in the description which follows and, in part, will be obvious from the description, or may be learned by practice of the general inventive concept.

Another aspect of the invention provides an image projecting apparatus having a cooling device, which cools heat generated from circuit boards and heat generated from light sources simultaneously.

Another aspect of the invention provides an image projecting apparatus including an optical engine and a cooing device to effectively cool heat generated a display device and light sources, in which the optical engine and the cooling device are efficiently disposed to enhance a cooling efficiency and allow the image projecting apparatus to have a small size and a light weight.

Yet another aspect of the invention provides an image projecting apparatus, in which a circuit board having various ports communicating with external apparatuses, a power supply port, and a remote controller receiving part, a main circuit board, and a light source driving part are separately disposed, and a cooling device cools light sources and the various circuit boards simultaneously.

In accordance with one aspect, the present invention provides an image projecting apparatus comprising a projecting system which projects light; a display device disposed in series with the projecting system; an optical system disposed in parallel with the projecting system, and including a plurality of light sources which transmit the light to the display device and generate heat when the light is transmitted to the display device; a heat dissipation device disposed at an outer edge of the optical system to dissipate the heat; and a cooling fan being opposite to the display device, which inhales air to cool the display device, and discharges the air to the heat dissipation device.

The heat dissipation device may include a plurality of heat diffusion plates which respectively contact the plurality of light sources; a heat transfer member which connects the plurality of heat diffusion plates such that heat can be transferred among the plurality of heat diffusion plates; and a heat sink disposed at an exterior of at least one of the plurality of heat diffusion plates, wherein the cooling fan is disposed in parallel with the heat sink.

The plurality of light sources may include a first LED module, a second LED module, and a third LED module respectively emitting light of different colors; and the heat sink may be disposed at an exterior of the heat diffusion plate disposed on the first LED module.

At the outer edge of the optical system, the first LED module may be disposed in parallel with the display device, the second LED module may be disposed opposite to the first LED module, and the third LED module may be disposed between the first LED module and the second LED module.

The first LED module may include at least one red LED to emit red light.

The heat sink may include a plurality of cooling fins, and the cooling fins may be formed in the horizontal direction such that an air current generated from the cooling fan can pass through the cooling fins.

The heat transfer member may include at least one heat pipe.

A guide plate to guide an air current generated from the cooling fan to the heat sink may be disposed between the cooling fan and the heat sink.

A heat radiation plate may be disposed between the heat diffusion plate disposed on the first LED and the heat sink, wherein the heat radiation plate dissipates heat generated from the heat diffusion plate disposed on the first LED module to the heat sink.

A main circuit board may be disposed on the upper surfaces of the projecting system, the optical system, and the heat dissipation device, and a portion of the main circuit board may contact the heat sink.

A shield to shield electromagnetic waves generated from electronic parts mounted on the upper surface of the main circuit board may be provided on a portion of the upper surface of the main circuit board.

An interface circuit board, on which a plurality of input ports to input a plurality of external signals is mounted, may be disposed at an exterior of the heat sink; and the interface circuit board may be cooled by the heat sink.

An audio output port to output an audio signal may be further mounted on the interface circuit board.

A remote controller receiving part to receive a signal from a remote controller may be further mounted on the interface circuit board.

A light source driving part to drive the plurality of light sources may be disposed at the exterior of at least one of the plurality of heat diffusion plates, and transmit heat to the corresponding heat diffusion plate and thus be cooled.

The plurality of light sources may include a first LED module, a second LED module, and a third LED module respectively emitting light of different colors; and the light source driving part may be an LED driving circuit board disposed at an exterior of a heat diffusion plate which contacts the second LED module or a heat diffusion plate which contacts the third LED module.

The display device may include a DMD and a DMD driving circuit board to drive the DMD, and the cooling fan is disposed at the rear of the DMD driving circuit board.

A heat radiation plate may be disposed between the cooling fan and the DMD driving circuit board.

The image projecting apparatus may further comprise an auxiliary cooling fan disposed at an exterior of the projecting system to inhale external air or discharge internal hot air to cool the projecting system and the optical system.

In accordance with another aspect, the present invention provides an image projecting apparatus comprising a projecting system which projects light; a display device disposed in series with the projecting system; an optical system disposed in parallel with the projecting system, and including a plurality of light sources which transmit the light to the display device; a light source driving part to drive the plurality of light sources; an interface circuit board having at least one input port; a main circuit board which controls the light source driving part and the interface circuit board; a heat dissipation device, disposed at an outer edge of the optical system; which collects and dissipates heat generated from the plurality of light sources, the light source driving part, the interface circuit board, and the main circuit board; and a cooling fan which cools the display device and the heat dissipation device.

The display device may be cooled by air inhaled by the cooling fan.

The heat dissipation device may include a plurality of heat diffusion plates which respectively contact the plurality of light sources; a heat transfer member which connects the plurality of heat diffusion plates such that heat can be transferred among the plurality of heat diffusion plates; and a heat sink disposed at the exterior of at least one of the plurality of heat diffusion plates, wherein the cooling fan is disposed in parallel with the heat sink.

A portion of the main circuit board may contact the heat sink such that the main circuit board can transmit heat to the heat sink.

The light source driving part may contact at least one of the plurality of heat diffusion plates.

The interface circuit board may contact the outer surface of the heat sink.

BRIEF DESCRIPTION OF THE DRAWINGS

These and/or other aspects and utilities of the present general inventive concept will become apparent and more readily appreciated from the following description of the exemplary embodiments, taken in conjunction with the accompanying drawings in which.

DETAILED DESCRIPTION OF THE PREFERRED EMBODIMENTS

Reference will now be made in detail to the exemplary embodiment of the present general inventive concept, an example of which is illustrated in the accompanying drawings, wherein like reference numerals refer to like elements throughout. The exemplary embodiment is described below to explain the present general inventive concept by referring to the annexed drawings.

Although the exemplary embodiment of the present invention will describe a small image projecting apparatus using a DMD panel, which is a reflection-type display device, the present invention is not limited thereto.

Figure 1:
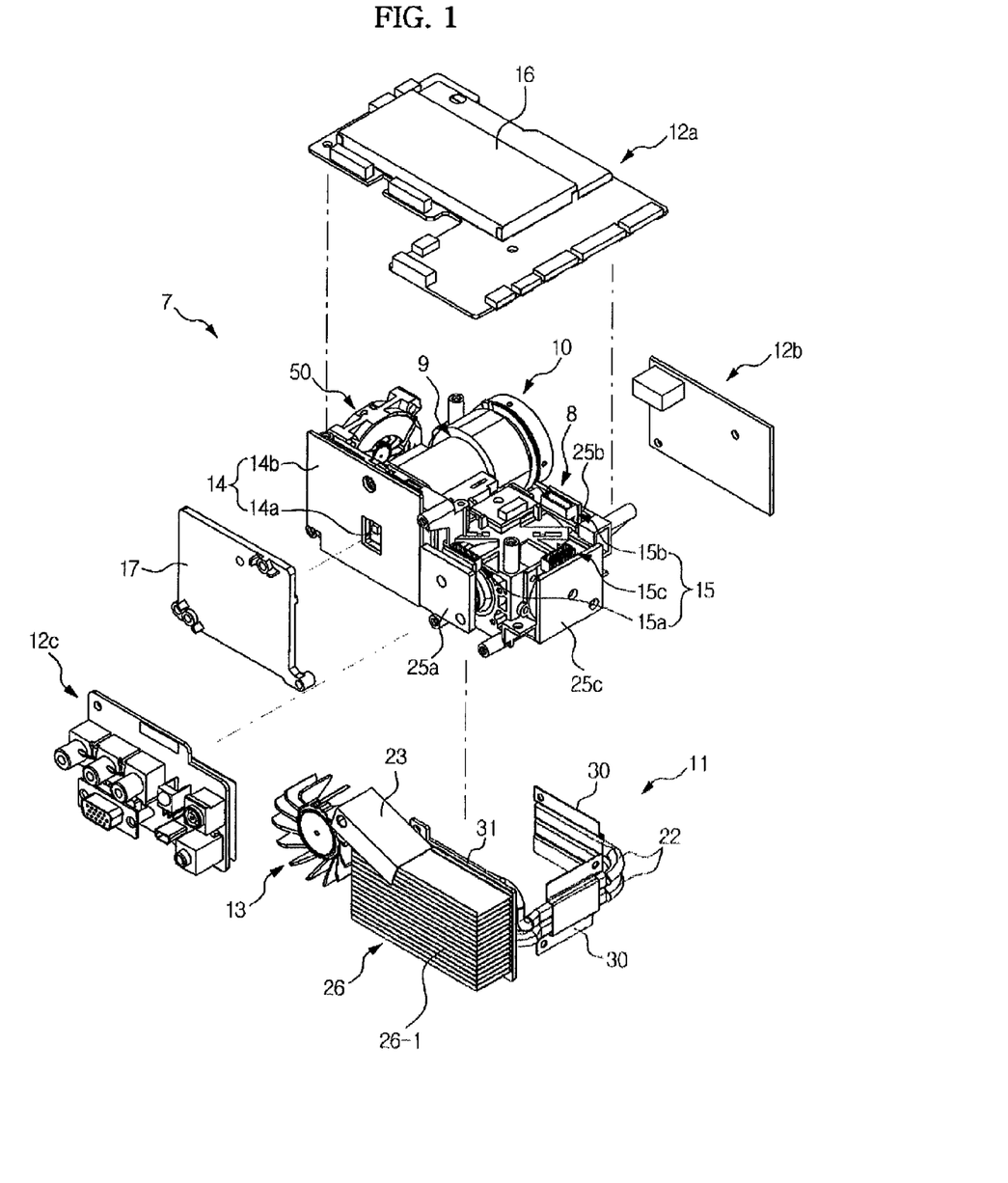
FIG. 1 is an exploded perspective view of an image projecting apparatus in accordance with one exemplary embodiment of the present invention.
Figure 2:
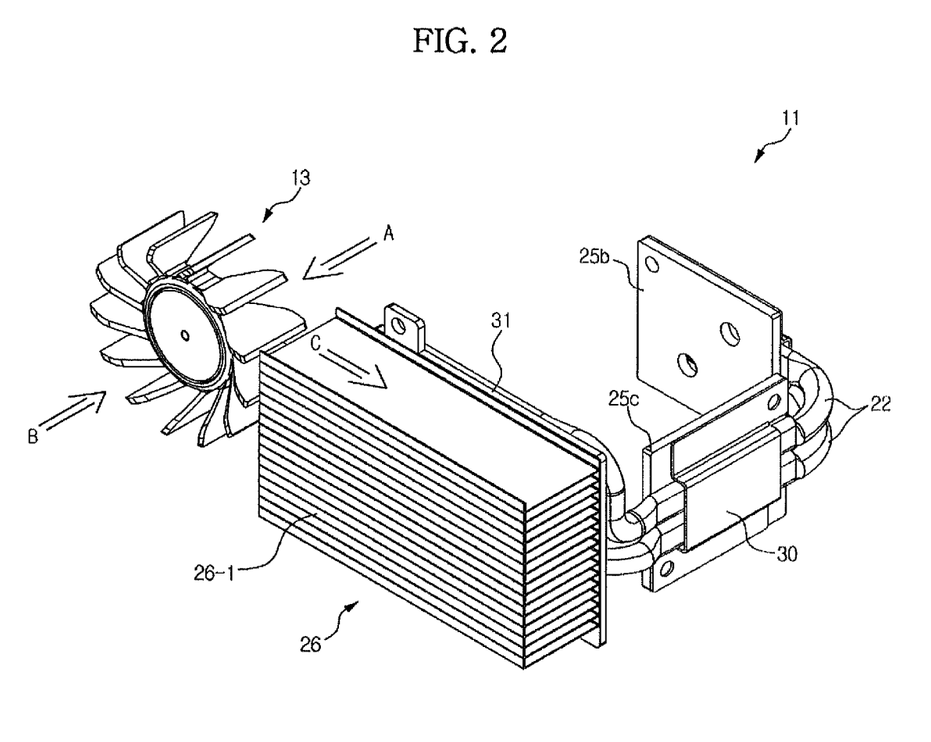
FIGS. 2 and 3 are views respectively illustrating portions extracted from FIG. 1.
Figure 3:
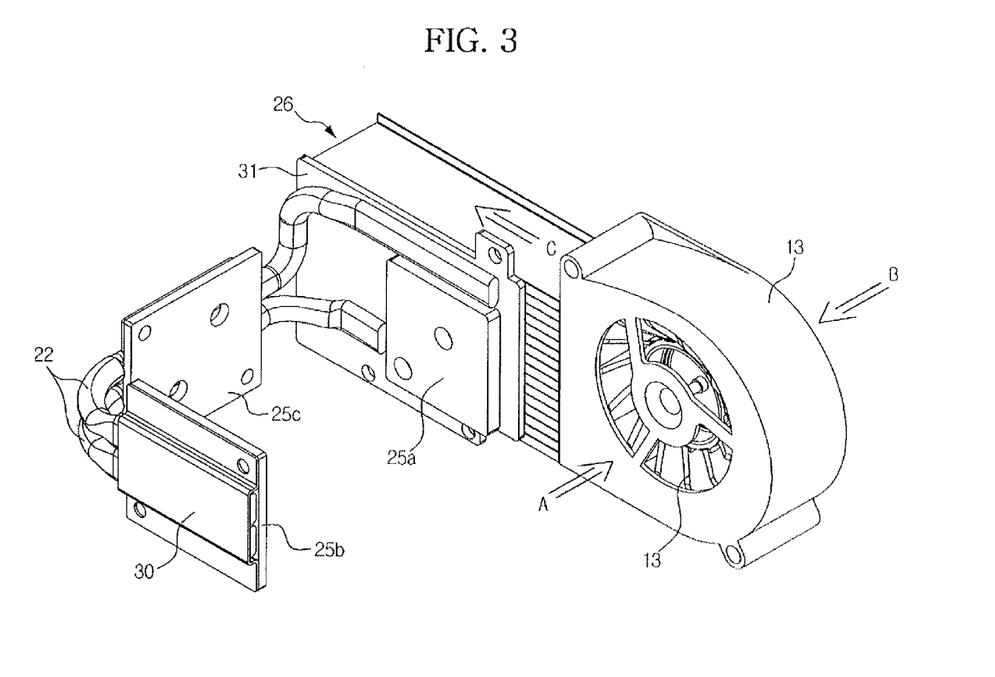
Figure 4:
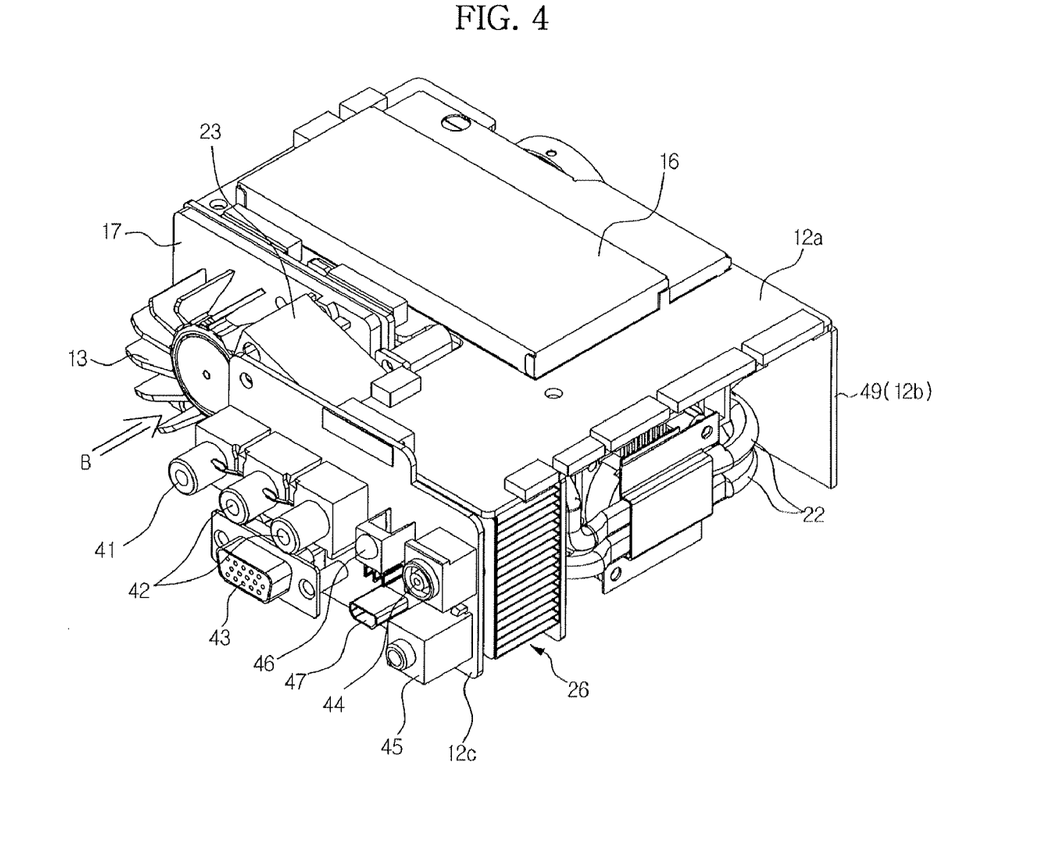
FIG. 4 is an assembled perspective view of the image projecting apparatus in accordance with the exemplary embodiment of the present invention.
Figure 5:
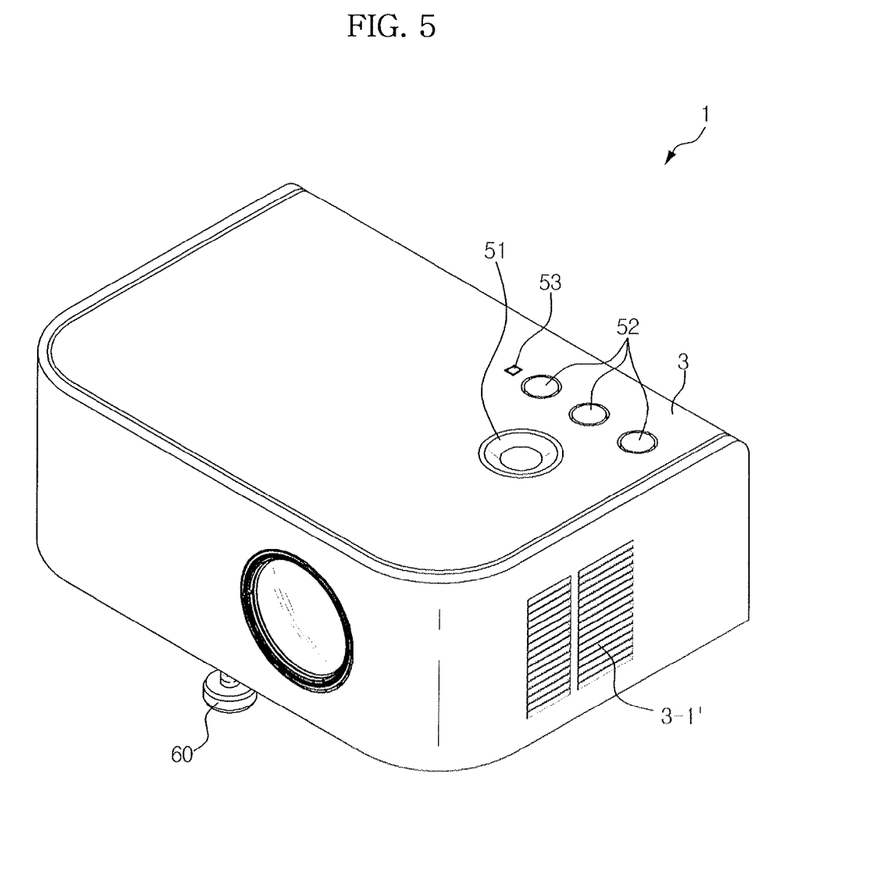
FIGS. 5 and 6 are perspective views illustrating the external appearance of the image projecting apparatus in accordance with the exemplary embodiment of the present invention.
Figure 6:
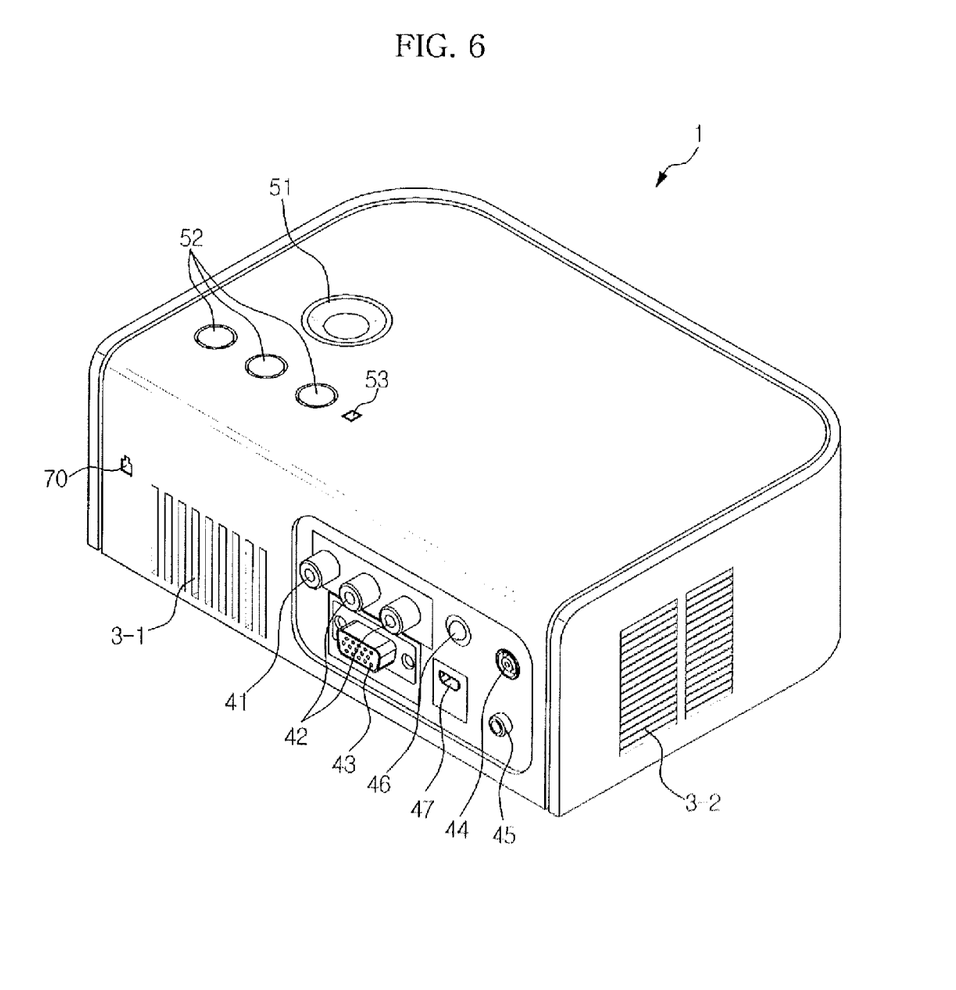

FIG. 1 is an exploded perspective view of an image projecting apparatus in accordance with one exemplary embodiment of the present invention, FIGS. 2 and 3 are views respectively illustrating portions extracted from FIG. 1, FIG. 4 is an assembled perspective view of the image projecting apparatus in accordance with the exemplary embodiment of the present invention, and FIGS. 5 and 6 are perspective views illustrating the external appearance of the image projecting apparatus in accordance with the exemplary embodiment of the present invention. FIG. 3 illustrates a case that a duct 33 is installed around a cooling fan 13.

With reference to FIGS. 1 to 6, an image projecting apparatus 1 in accordance with the exemplary embodiment of the present invention includes a housing 3 (shown in FIGS. 5 and 6), and a main body frame 7 disposed in the housing 3.

The main body frame 7 includes an optical engine unit 10 including an optical system 8 and a projecting system 9, a heat dissipation device 11 having a structure surrounding the optical engine unit 10, a circuit unit including a plurality of circuit boards 12a, 12b, and 12c, and a cooling fan 13 to cool the heat dissipation device 11 and the optical engine unit 10 simultaneously.

Hereinafter, with reference to FIGS. 1 to 6, the optical engine unit 10 of the image projecting apparatus 1 in accordance with one exemplary embodiment of the present invention will be described in detail.

The optical engine unit 10 includes the projecting system 9, in which plural lenses (not shown) are disposed in a line to enlarge an image received by an external apparatus and project the enlarged image on a screen (not shown), a reflection-type display device 14 disposed in series with the projecting system 9, and the optical system 8 disposed in parallel with the projecting system 9 and including a plurality of light sources 15 to transmit light to the display device 14. The plural light sources 15 respectively emit light of different colors from the outer edge of the optical system 8 to the display device 14 in different directions.

Here, the reflection-type display device 14 includes a DMD 14a, and a DMD driving circuit board 14b to drive the DMD 14a.

In one exemplary embodiment of the present invention, the light sources 15 are point light sources for emitting light of red, blue, and green, each of which uses a plurality of LEDs. However, the light sources 15 may be replaced with other point light sources.

In one exemplary embodiment of the present invention, the light sources 15 include a first LED module 15a having at least one red LED (not shown), a second LED module 15b disposed opposite to the first LED module 15a and having at least one blue LED (not shown), and a third LED module 15c disposed between the first LED module 15a and the second LED module 15b and having at least one green LED (not shown).

Here, the first LED module 15a is disposed in parallel with the display device 14, and the positions of the second LED module 15b and the third LED module 15c are interchangeable.

The heat dissipation device 11 contacts the plural light sources 15 at the outer edge of the optical system 8 and allows heat generated from the plural light sources 15 to be dissipated. Here, the heat generated from the light sources 15 includes heat generated from at least one LED mounted on each of the LED modules according to the driving of at least plural LED modules of the light sources, heat transmitted from peripheral circuit devices, and heat generated from the insides and outsides of other devices.

The circuit unit includes an interface circuit board 12c having a plurality of input ports to receive a plurality of external signals and a power supply, a light source driving part 12b to drive the plural light sources 15 of the optical system 8, and a main circuit board 12a to control the interface circuit board 12c and the light source driving part 12b.

A shield 16 to shield electromagnetic waves generated from electronic parts (not shown) mounted on the main circuit board 12a is provided on the upper surface of the main circuit board 12a, and covers the electronic parts.

The cooling fan 13 is disposed close to the display device 14, and inhales air of a high temperature around the display device 14 and external air simultaneously through absorption parts at both sides thereof and thus forms an air current in the direction of the heat dissipation device 11.

A heat radiation plate 17 is disposed between the cooling fan 13 and the DMD driving circuit board 14b of the display device 14, and thus heat generated from the display device 14 is transmitted to the heat radiation plate 17. The cooling fan 13 inhales ambient air raised to a high temperature by the heat dissipated from the heat radiation plate 17 and inhales external air of a relatively low temperature simultaneously, and thus forms an air current toward the heat dissipation device 11, thereby allowing the heat generated from the display device 14 to be dissipated and the heat dissipation device 11 to be cooled simultaneously.

Here, the heat radiation plate 17 is made of aluminum having a high thermal conductivity, and serves to dissipate heat and fix the display device 14 and the cooling fan simultaneously.

The image projecting apparatus 1 further includes a guide member to guide the air current generated by the cooling fan 13. The guide member includes a duct 33 disposed at the circumference of the cooling fan 13, as shown in FIG. 3. The duct 33 is provided with openings formed through both surfaces thereof and one side surface thereof, being adjacent to the heat dissipation device 11, and thus guides inhaled air through the openings of both surfaces of the cooling fan 13 and guide discharged air through the opening formed through the surface of the cooling fan 13, being adjacent to the heat dissipation device 11. Otherwise, the guide member includes a guide plate 23 disposed between the cooling fan 13 and the heat dissipation device 11 to guide the air current generated by the cooling fan 13 toward the heat dissipation device 11, as shown in FIG. 1.

Further, an auxiliary cooling fan 50 to cool the display device 14 and the optical system 9 may be disposed at the outside of the projecting system 9.

The auxiliary cooling fan 50 inhales external air or emits hot air in the housing 3 in order to dissipate heat from the projecting system 9, the display device 14, and the optical system 9, thus enhancing cooling efficiency.

Hereinafter, with reference to FIGS. 2 and 3, the constitution and operation of one exemplary embodiment of the image projecting apparatus in accordance with the present invention will be described.

The constitution and operation of the heat dissipation device 11 of the image projecting apparatus in accordance with one exemplary embodiment of the present invention will be described, as follows.

In the image projecting apparatus of the exemplary embodiment of the present invention, the heat dissipation device 11 includes a plurality of heat diffusion plates 25a, 25b, and 25c respectively corresponding to the first, second, and third LED modules 15a, 15b, and 15c disposed at the outer edge of the optical system 8, a heat transfer member 22 interconnecting the plural heat diffusion plates 25a, 25b, and 25c such that heat can be transferred among the plural heat diffusion plates 25a, 25b, and 25c, and a heat sink 26 disposed at the outside of the heat diffusion plate 25a corresponding to the first LED module 15a.

Here, reference numeral 30 represents fixing plates to fix the heat transfer member 22 to the plural heat diffusion plates 25a, 25b, and 25c. The fixing plates 30 are respectively screw-connected to the plural heat diffusion plates 25a, 25b, and 25c. However, the fixing plates 30 may be respectively connected to the plural heat diffusion plates 25a, 25b, and 25c by various methods.

LEDs used as light sources in the exemplary embodiment of the present invention are semiconductor devices having physical properties, in which the quantity of light according to a luminosity factor is lowered when a temperature is raised, and thus it is important to keep the LEDs at a designated temperature. Particularly, a red LED is more sensitive to temperature than a blue LED or a green LED. Thus, in one exemplary embodiment of the present invention, the heat sink 26 is disposed at the outside of the heat diffusion plate 25a contacting the first LED module 15a including at least one red LED.

Here, a heat radiation plate 31 is disposed between the heat diffusion plate 25a connected to the first LED module 15a and the heat sink 26 so as to enhance a cooling efficiency.

The cooling fan 13 disposed close to the display device 14 is located at one side surface of the heat sink 26 of the heat dissipation device 11.

That is, in the image projecting apparatus 1 of the exemplary embodiment of present invention, the cooling fan 13 inhales external air and ambient air of the heat radiation plate 17 contacting the display device 14 in the directions of front and rear surfaces of the cooling fan 13 (the direction A and the direction B), and thus forms an air current in the direction of the heat sink 26 (the direction C).

The heat sink 26 includes a plurality of cooling fins 26-1, and the cooling fins 26-1 are formed in the horizontal direction (the direction C) such that the air current generated from the cooling fan 13 can pass through the cooling fins 26-1.

The heat transfer member 22 may include heat pipes. The heat pipes may be vacuum airtight pipes, but are not limited thereto. In this case, a porous material is provided on the inner walls of the vacuum airtight pipes, and thus can be saturated with a small amount of a working fluid in a liquid state, such as water, ethanol, or acetone. The working fluid at high-temperature portions of the heat pipes, being close to the light sources 15, absorbs heat of a high temperature and thus evaporates, and then the evaporated working fluid at low-temperature portions of the heat pipes, being close to the heat sink 26, condenses and thus emits heat to the outside. The condensed working fluid at the low-temperature portions of the heat pipes is returned to the high-temperature portions of the heat pipes due to a difference of capillary pressures generated from the interface of the porous material between the low-temperature portions and the high-temperature portions of the heat pipes, and thus a cooling cycle is circulated.

Herein, a plurality of heat pipes may be provided, as occasion demands. For example, as shown in FIGS. 1 and 3, two heat pipes are provided. However, three or more heat pipes may be provided and a single heat pipe may be provided.

With reference to FIGS. 1 to 4, the circuit unit will be described, as follows.

The circuit unit, as shown in FIGS. 1 to 4, includes the interface circuit board 12c having a plurality of input ports to receive a plurality of external signals and a power supply, the light source driving part 12b to drive the plural light sources 15 of the optical system 8, and the main circuit board 12a to control the interface circuit board 12c and the light source driving part 12b. The interface circuit board 12c, the light source driving part 12b, and the main circuit board 12a is entirely or partially contact the heat dissipation device 11 respectively.

As shown in FIGS. 1 to 4, in the image projecting apparatus of the exemplary embodiment of the present invention, the interface circuit board 12c having the plural input ports to receive a plurality of external signals and a power supply contacts the outer surface of the heat sink 26.

An image signal input port 41, audio signal input ports 42, and a computer signal port 43 are mounted on the interface circuit board 12c. Further, a connection port 47 to update and repair embedded software and a power port 44 to supply power are mounted on the interface circuit board 12c. Moreover, an audio output port 45 is mounted on the interface circuit board 12c, and thus allows a user to hear audio, inputted from the outside through the audio signal input ports 42, through a headphone connected to the audio output port 45.

Further, a remote control receiving part 46 is mounted between the audio signal input ports 42 and the power port 44.

Here, two audio signal input ports 42 are provided such that right and left audios are separated from each other and are inputted to the corresponding audio signal input ports 42. The image signal input port 41 is connected to various image reproducing apparatuses, such as a set-top box and a DVD player. Other various input ports may be mounted according to signal transmission standards.

That is, the image projecting apparatus 1 of the exemplary embodiment of the present invention includes the interface circuit board 12c disposed therein such that the various ports and the power port 44 can be exposed from the rear surface of the image projecting apparatus 1, and the remote controller receiving part 46 to allow a user at the rear of the image projecting apparatus 1 to easily control the image projecting apparatus 1 using a remote controller (not shown) is mounted on the interface circuit board 12c.

Further, the light source driving part 12b to drive the light sources 15 is included. As shown in FIGS. 1 to 4, when the light sources 15 use a plurality of LED modules, the light source driving part 12b includes an LED driving circuit board 49 disposed at the outside of the heat diffusion plate 25b contacting the second LED module 15b. The LED driving circuit board 49 drives the first LED module 15a, the second LED module 15b, and the third LED module 15c, which serve as the light sources.

The LED driving circuit board 49 may be disposed at the outside of the heat diffusion plate 25c contacting the third LED module 15c. However, in this exemplary embodiment of the present invention, the LED driving circuit board 49 is disposed at the outside of the heat diffusion plate 25b contacting the second LED module 15b.

The main circuit board 12a electrically connected with the interface circuit board 12c and the LED driving circuit board 49 is disposed on the upper surface of the optical engine unit 10.

A microcontroller IC to control the operation of the image projecting apparatus 1 and electronic parts (not shown) required for other electric operations are mounted on the main circuit board 12a.

The shield 16, which partly covers the electronic parts to shield electromagnetic waves generated from the electronic parts, is mounted on the main circuit board 12a.

A portion of the main circuit board 12a contacts the upper portion of the sink 26, and thus heat generated by the operation of the electronic parts on the main circuit board 12a is cooled by the heat sink 26.

The interface circuit board 12c contacts the heat sink 26, the LED driving circuit board 49 contacts the heat diffusion plate 25b of the second LED module 15b, and the main circuit board 12a covers the optical engine unit 10 on condition that a portion of the main circuit board 12a contacts the upper surface of the heat sink 26. Thus, heat generated from the respective circuit boards is cooled by the heat sink 26 and the heat diffusion plate 25b.

An air inlet 3-1 to supply external air to the cooling fan 13 or the auxiliary cooling fan 50 and an air outlet 3-2 to discharge hot air, passed through the heat sink 26, to the outside are formed through the housing 3 of the image projecting apparatus 1 of the exemplary embodiment of the present invention, as shown in FIGS. 5 and 6.

The air inlet 3-1 and the air outlet 3-2 of the housing 3 have a structure having a plurality of through holes, a lattice structure, or a slot structure.

The air outlet 3-2 is formed through a side surface of the housing 3 corresponding to the position of the heat sink 26, as shown in FIG. 6, such that the hot air, passed through the heat sink 26, can be discharged just to the outside.

The air inlet 3-1 is formed through one side of the rear surface of the housing 3 corresponding to the position of the cooling fan 13, as shown in FIGS. 5 and 6, such that the cooling fan 13 can inhale external air.

Further, a separate air inlet 3-1' is formed through a side surface of the housing 3 corresponding to the position of the auxiliary cooling fan 50 such that the auxiliary cooling fan 50 can directly inhale external air when external air is inhaled by the auxiliary cooling fan 50. Here, if the auxiliary cooling fan 50 is used to discharge hot air in the housing 3 to the outside of the housing 3, the air inlet 3-1' serves as an air outlet.

A standing member 60 to adjust the height of the image projecting apparatus 1 is included on the housing 3 of the image projecting apparatus 1, or a locking hole 70 connected with an anti-theft lock is formed through the housing 3 of the image projecting apparatus 1.

Further, a power key 51 to turn on/off the image projecting apparatus 1, various function keys 52 to operate the image projecting apparatus 1, and a display light 53 to show the state of the image projecting apparatus 1 are provided on the housing 3.

Now, a cooling process of the image projecting apparatus of the exemplary embodiment of the present invention will be described with reference to the annexed drawings.

First, heat generated from the display device 14 is transmitted to the heat radiation plate 17 connected to the DMD driving circuit board 14a of the display device 14 at the rear portion of the image projecting apparatus 1. The cooling fan 13 disposed at the side surface of the heat sink 26 at one side of the heat radiation plate 17 inhales external air and ambient air heated by the heat radiation plate 17 contacting the DMD driving circuit board 14 simultaneously, thus generating an air current in the direction of the heat sink 26 (the direction C). Hot air, which has absorbed heat from the heat sink 26, is discharged to the outside through the air outlet 3-2. Further, heat generated from the respective light sources 15a, 15b, and 15c is transmitted to the heat diffusion plates 25a, 25b, and 25c, and the heat transmitted to the heat diffusion plates 25b and 25c is transmitted to the heat diffusion plate 25a disposed at the first LED module 15a through the heat transfer member 22, such as a heat pipe. The heat collected by the heat diffusion plate 25a is transmitted to the heat radiation plate 31 contacting the heat sink 26, and then is cooled.

The interface circuit board 12c disposed at the outer surface of the heat sink 26 is cooled by the heat sink 26, through which the air current generated by the cooling fan 13 passes, and the main circuit board 12a disposed on the upper surface of the optical engine unit 10 partly contacts the upper surface of the heat sink 26 and thus is cooled by the heat sink 26.

The LED driving circuit board 49 to drive the light sources is disposed at the outer surface of the heat transfer member 22, such as a heat pipe, connected to the heat diffusion plate 25b contacting the second LED module 15b, and thus heat generated from the LED driving circuit board 49 is transmitted to the heat radiation plate 31 contacting the heat sink 26 by the heat transfer member 22 and then is cooled.

The auxiliary cooling fan 50 disposed at the outer edge of the projecting system 9 of the optical engine unit 10 inhales external air and forms an air current in the direction of the cooling fan 13, thus cooling the optical engine unit 10 and the display device 14. Otherwise, the auxiliary cooling fan 50 discharges air in the housing 3, thus enhancing the cooling efficiency of the optical engine unit 10 and the display device 14.

As apparent from the above description of the exemplary embodiment, the present invention provides an image projecting apparatus, in which a display device is effectively cooled by air inhaled into a cooling fan. Further, a heat dissipation device collects heat from various circuit boards and light sources and the cooling fan forms an air current toward the heat dissipation device, such that the heat dissipation device can efficiently dissipate heat, thus effectively cooling the circuit boards and the light sources.

In the image projecting apparatus of the exemplary embodiment of the present invention, the optical engine unit, the circuit board, the heat dissipation device, and the cooling fan are disposed to be easily assembled, and thus the production efficiency of the image projecting apparatus may be enhanced.

Although a few embodiments of the general inventive concept has been shown and described, it would be appreciated by those skilled in the art that changes may be made in this exemplary embodiment without departing from the principles and spirit of the general inventive concept, the scope of which is defined in the claims and their equivalents.

What is claimed is:

1. An image projecting apparatus comprising:
   a projecting system which projects light;
   a display device disposed in series with the projecting system along a first axis;
   an optical system disposed in parallel with the projecting system in a direction parallel to a second axis perpendicular to the first axis, and including a plurality of light sources which transmit the light to the display device and generate heat when the light is transmitted to the display device;
   a heat dissipation device, disposed at an outward-facing side of the optical system to dissipate the heat; and
   a cooling fan disposed adjacent to the display device, which inhales air across the display device to cool the display device and discharges the air across the heat dissipation device in the direction parallel to the second axis to cool the heat dissipation device.

2. The image projecting apparatus according to claim 1, wherein the heat dissipation device includes:
   a plurality of heat diffusion plates which respectively contact the plurality of light sources;
   a heat transfer member which connects the plurality of heat diffusion plates such that the heat can be transferred among the plurality of heat diffusion plates; and
   a heat sink disposed at an exterior of at least one of the plurality of heat diffusion plates,
   wherein the cooling fan is disposed in parallel with the heat sink in the direction parallel to the second axis.

3. The image projecting apparatus according to claim 2, wherein:
   the plurality of light sources includes a first LED module, a second LED module, and a third LED module respectively emitting light of different colors; and
   the heat sink is disposed at an exterior of a heat diffusion plate disposed on the first LED module.

4. The image projecting apparatus according to claim 3, wherein at the outer edge of the optical system, the first LED module is disposed in parallel with the display device in the direction parallel to the second axis, the second LED module is disposed opposite to the first LED module, and the third LED module is disposed between the first LED module and the second LED module.

5. The image projecting apparatus according to claim 3, wherein the first LED module includes at least one red LED which emits red light.

6. The image projecting apparatus according to claim 2, wherein the heat sink includes a plurality of cooling fins, and the cooling fins are formed in the horizontal direction such that an air current generated from the cooling fan can pass through the cooling fins.

7. The image projecting apparatus according to claim 2, wherein the heat transfer member includes at least one heat pipe.

8. The image projecting apparatus according to claim 2, wherein a guide plate to guide an air current generated from the cooling fan to the heat sink is disposed between the cooling fan and the heat sink.

9. The image projecting apparatus according to claim 3, wherein a heat radiation plate is disposed between the heat diffusion plate disposed on the first LED and the heat sink, wherein the heat radiation plate dissipates heat generated from the heat diffusion plate disposed on the first LED module to the heat sink.

10. The image projecting apparatus according to claim 2, wherein a main circuit board is disposed on the upper surfaces of the projecting system, the optical system and the heat dissipation device, and a portion of the main circuit board contacts the heat sink.

11. The image projecting apparatus according to claim 10, wherein a shield which shields electromagnetic waves generated from electronic parts mounted on the upper surface of the main circuit board is provided on a portion of the upper surface of the main circuit board.

12. The image projecting apparatus according to claim 2, wherein:
an interface circuit board, on which a plurality of input ports to input a plurality of external signals is mounted, is disposed at an exterior of the heat sink; and
the interface circuit board is cooled by the heat sink.

13. The image projecting apparatus according to claim 12, wherein an audio output port to output an audio signal is further mounted on the interface circuit board.

14. The image projecting apparatus according to claim 12, wherein a remote controller receiving part to receive a signal from a remote controller is further mounted on the interface circuit board.

15. The image projecting apparatus according to claim 2, wherein a light source driving part to drive the plurality of light sources is disposed at the exterior of at least one of the plurality of heat diffusion plates, and transmits heat to the corresponding heat diffusion plate.

16. The image projecting apparatus according to claim 15, wherein:
the plurality of light sources includes a first LED module, a second LED module, and a third LED module respectively emitting light of different colors; and
the light source driving part is an LED driving circuit board disposed at an exterior of the heat diffusion plate which contacts the second LED module or a heat diffusion plate which contacts the third LED module.

17. The image projecting apparatus according to claim 1, wherein the display device includes a DMD and a DMD driving circuit board to drive the DMD, and the cooling fan is disposed at the rear of the DMD driving circuit board along the first axis.

18. The image projecting apparatus according to claim 17, wherein a heat radiation plate is disposed between the cooling fan and the DMD driving circuit board.

19. The image projecting apparatus according to claim 1, further comprising an auxiliary cooling fan disposed at an exterior of the projecting system to inhale external air or discharge internal hot air to cool the projecting system and the optical system.

20. The image projecting apparatus according to claim 1, wherein the display device is a reflection-type display device.

21. The image projecting apparatus according to claim 1, wherein the air inhaled by the cooling fan includes high temperature air from around the display device and external air.

22. An image projecting apparatus comprising:
a projecting system which projects light;
a display device disposed in series with the projecting system along a first axis;
an optical system disposed in parallel with the projecting system in a direction parallel to a second axis perpendicular to the first axis, and including a plurality of light sources which transmit the light to the display device;
a light source driving part which drives the plurality of light sources;
an interface circuit board having at least one input port;
a main circuit board which controls the light source driving part and the interface circuit board;
a heat dissipation device, disposed at an outer edge of the optical system, which collects and dissipates heat generated from the plurality of light sources, the light source driving part, the interface circuit board, and the main circuit board; and
a cooling fan which cools the display device and the heat dissipation device by inhaling air across the display device and exhaling air across the heat dissipation device.

23. The image projecting apparatus according to claim 22, wherein the heat dissipation device includes:
a plurality of heat diffusion plates which respectively contact the plurality of light sources;
a heat transfer member which connects the plurality of heat diffusion plates such that heat can be transferred among the plurality of heat diffusion plates; and
a heat sink disposed at an exterior of at least one of the plurality of heat diffusion plates,
wherein the cooling fan is disposed in parallel with the heat sink in the second direction to pass air from the fan along the heat sink.

24. The image projecting apparatus according to claim 23, wherein a portion of the main circuit board contacts the heat sink such that the main circuit board transmits the heat to the heat sink.

25. The image projecting apparatus according to claim 23, wherein the light source driving part contacts at least one of the plurality of heat diffusion plates.

26. The image projecting apparatus according to claim 23, wherein the interface circuit board contacts the outer surface of the heat sink.

27. The image projecting apparatus according to claim 22, wherein the display device is a reflection-type display device.

28. The image projecting apparatus according to claim 22, wherein the air inhaled by the cooling fan includes high temperature air from around the display device and external air.

* * * * *